United States Patent [19]

Miller

[11] Patent Number: 4,479,728
[45] Date of Patent: Oct. 30, 1984

[54] TURBOCHARGER BEARING SYSTEM

[75] Inventor: Steven M. Miller, West Yorkshire, England

[73] Assignee: Holset Engineering Company Limited, Turnbridge, England

[21] Appl. No.: 488,502

[22] Filed: Apr. 22, 1983

[30] Foreign Application Priority Data

Apr. 22, 1982 [GB] United Kingdom ............... 8211698

[51] Int. Cl.³ .............................................. F16C 17/04
[52] U.S. Cl. .................................................... 384/369
[58] Field of Search ............... 384/369, 368, 371, 123, 384/112, 420

[56] References Cited

U.S. PATENT DOCUMENTS

| | | | |
|---|---|---|---|
| 3,141,909 | 7/1964 | Mayo | 384/420 |
| 3,399,000 | 8/1968 | Remmers | 384/112 |
| 3,575,476 | 4/1971 | Ortman | 384/112 |
| 4,243,275 | 1/1981 | Czuszak | 384/369 |

*Primary Examiner*—Lenard A. Footland
*Attorney, Agent, or Firm*—Gary M. Gron; Robert T. Ruff

[57] ABSTRACT

The disclosure illustrates a turbocharger bearing assembly for the shaft which supports a compressor and turbine for rotation. The bearing assembly accomodates axial thrust and comprises a plate with a central aperture through which the shaft extends, the central shaft having a pair of flanges adjacent or opposite faces of the plate. Each face of the plate has a plurality of tapered lands having a low end and high end which define bearing sectors disposed in succession in an arcuate way about the aperture. Each sector, in the radially outer portion thereof adjacent the high end is retrenched along the sector towards the low end of the sector so that along the direction of rotation of the counter thrust surface relative to the sector, the outer portion of the high end terminates before a more radially inner portion of the high end. An oil supply passage feeds oil to the faces of the plate to provide an oil film over the bearing sectors.

10 Claims, 12 Drawing Figures

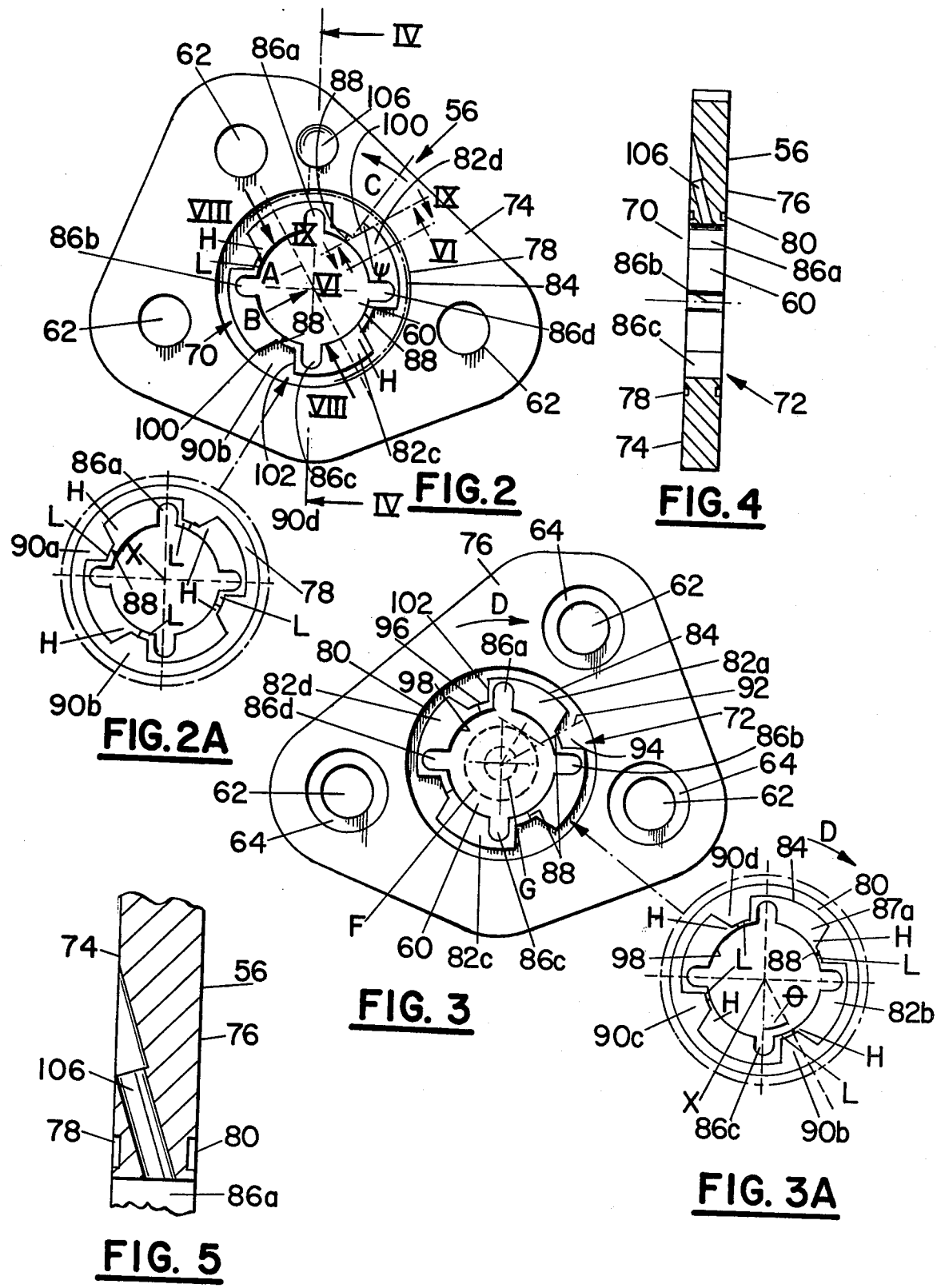

TURBOCHARGER BEARING SYSTEM

This invention concerns a turbocharger.

Turbochargers are known in which a turbine wheel to be driven by exhaust gas from an internal combustion engine is arranged to drive a compressor wheel for compressing combustion air to be supplied to the engine.

In a known turbocharger the turbine and compressor wheels are mounted on a common shaft which is substantially held against axial displacement by a thrust bearing facing a rotating counter-thrust surface positioned in a first plane which is substantially at a right-angle to the shaft axis, and it is intended that a second plane, in which the thrust bearing lies, should be parallel to the first plane. Because of play in various bearings supporting the rotating shaft, the shaft axis describes a conical figure. As a result the first plane is inclined to the second so that the gap between them takes on a wedge-like shape narrowest where the radially outermost portion of the counter-thrust surface is closest to the thrust bearing. As the shaft traces the conical figure the narrowest gap between the counter-thrust surface and the thrust bearing moves around the latter. The efficiency of such a turbocharger (which can rotate at high speed, for example 120,000 rpm) is impaired by the retarding effect of the development of shear forces in lubricating oil in the gap between the thrust bearing and the counter-thrust surface. Since the thrust bearing is stationary the oil lamina next to it is also substantially stationary whereas the oil lamina next to counter-thrust surface moves at substantially the angular velocity of the counter-thrust surface. There is a velocity gradient across the oil layer which becomes deeper as the oil layer becomes thinner assuming the oil viscosity remains substantially constant). Therefore since the aforesaid gap is narrowed due to the shaft describing the conical figure, the frictional force retarding the shaft increases.

To reduce the development of increased frictional force when a shaft acting on the thrust bearing describes a conical figure as the shaft rotates, tapered-land thrust bearings have been used. These can comprise a plate formed with an aperture to receive the shaft, and the plate being also formed with a plurality of tapered lands providing bearing sectors disposed in succession in an annular array about the shaft, each sector having a wedge-like shape extending in a direction along the sector from a low end towards the other or high end so that there is a step-down from the high end of one sector to the level of the low end of the succeeding sector. It should be understood that the terms "high", "low", "step-down" and "level" are used herein in relation to tapered-land thrust bearings in an illustrative or figurative sense with the intention of merely identifying different portions of a wedge-like shape and are not intended to impose any limitation on the disposition of the sectors.

As the counter-thrust surface slides across the surface of each sector from low to high end, as the shaft moves through a conical figure, the counter-thrust surface progressively increases the pressure in the lubricating oil (even though some oil escapes beyond the edges of the sector) and therefore provides the thrust load carrying capacity of the oil between the counter-thrust surface and the sector. The pressure is a maximum when the portion of the counter-thrust surface tilted towards the sector is almost opposite the high end.

Maximum friction, due to the shear forces acting on the oil, occurs only when the portion of the tilted counter-thrust surface nearest to a sector is substantially opposite the high end. At other times friction due to shearing is less. Thus, instead of this maximum friction occurring throughout the description of the conical figure by the shaft, it only occurs the number of times during that description that any part of the tilted counter-thrust surface nearest the thrust bearing is opposite the high end of any sector. So the aggregate effect of friction due to shearing of the oil is less using a tapered-land bearing.

Friction between the counter-thrust surface and the tapered-land thrust bearing is a function of the aggregate of the surface or bearing areas of the sectors. The inner diameter of the annular array of sectors is determined by the diameter of the aperture which is itself determined to a great extent by the diameter of the shaft. As a result the aforesaid aggregate surface area is reduced in known bearings by making the outer diameter of the annular array of sectors as small as practicable. Nevertheless, as stated above, maximum friction due to shearing occurs at a high end of each sector.

An aim of the invention is to provide a turbocharger with a thrust bearing which can be constructed to at least further mitigate the development of increased frictional force when a rotating shaft acting on the bearing describes a conical figure.

According to the invention the above problems are solved by a turbocharger comprising a rotatable shaft extending in an aperture in a tapered-land thrust bearing facing a rotating counter-thrust surface provided on the shaft, the thrust bearing comprising a plurality of tapered lands providing bearing sectors disposed in succession in an annular array about the aperture. A radially outer portion of each sector at or adjacent the high end of the sector is retrenched along the sector towards the opposite low end of the sector such that along the direction of rotation of the counter-thrust surface past the sector said outer portion terminates before a more radially inner portion of said sector.

The above and other related features of the present invention will be found by a reading of the following description of the disclosure found in the accompanying drawings and the novelty thereof pointed out in the appended claims.

In the drawings:

FIG. 2 is a front view on enlarged scale of a plate formed with a thrust bearing for the turbocharger in FIG. 1, and FIG. 2A shows a portion of FIG. 2;

FIG. 3 is a view of the other side of the plate in FIG. 2 formed with another thrust bearing for the turbocharger, and FIG. 3A shows a portion of FIG. 3;

FIG. 4 is a section on line IV—IV in FIG. 2;

FIG. 5 is an enlarged fragment of FIG. 4;

Figure 1:
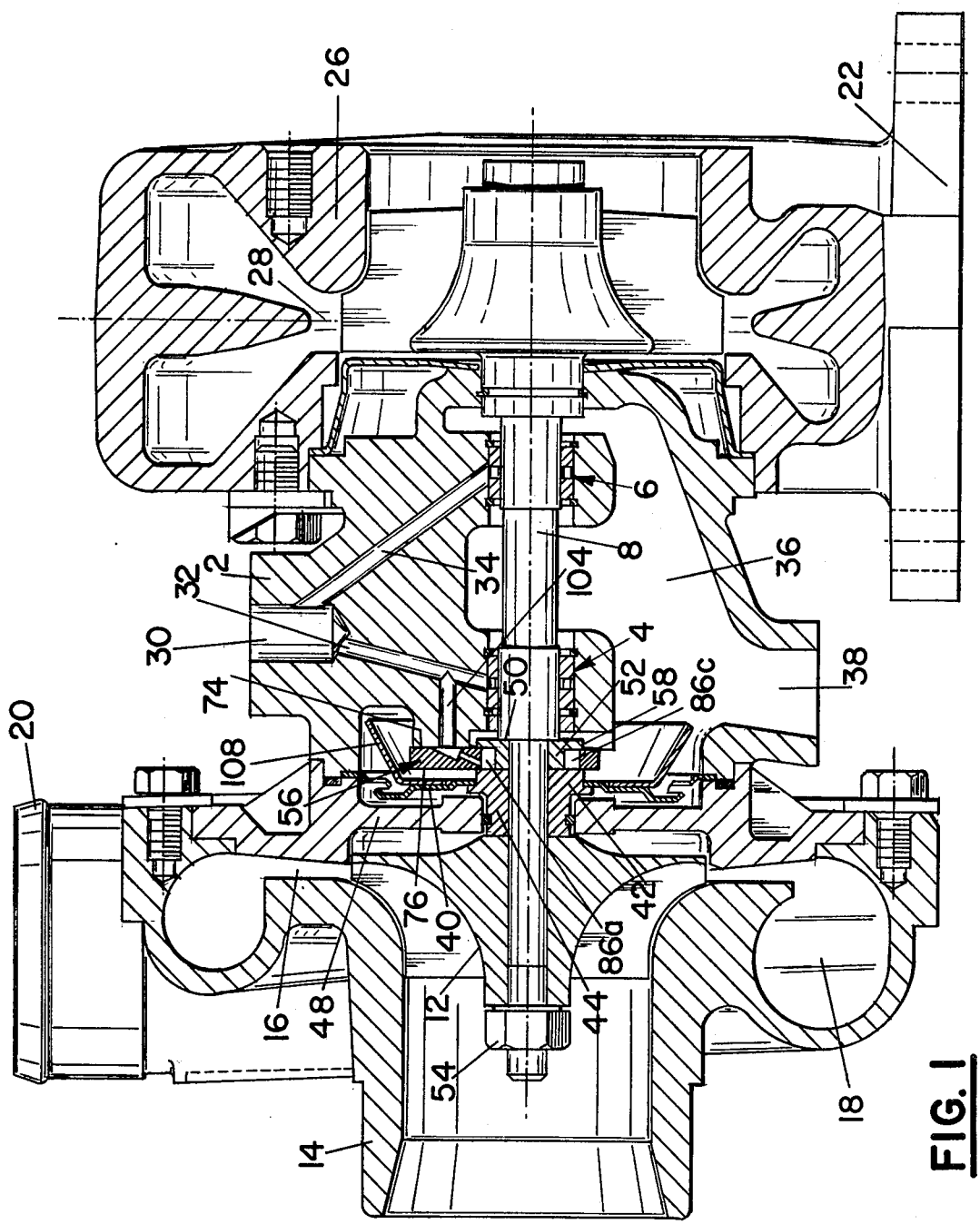
FIG. 1 is a fragmentary longitudinal section view of a turbocharger formed according to the invention.
Figure 1A:
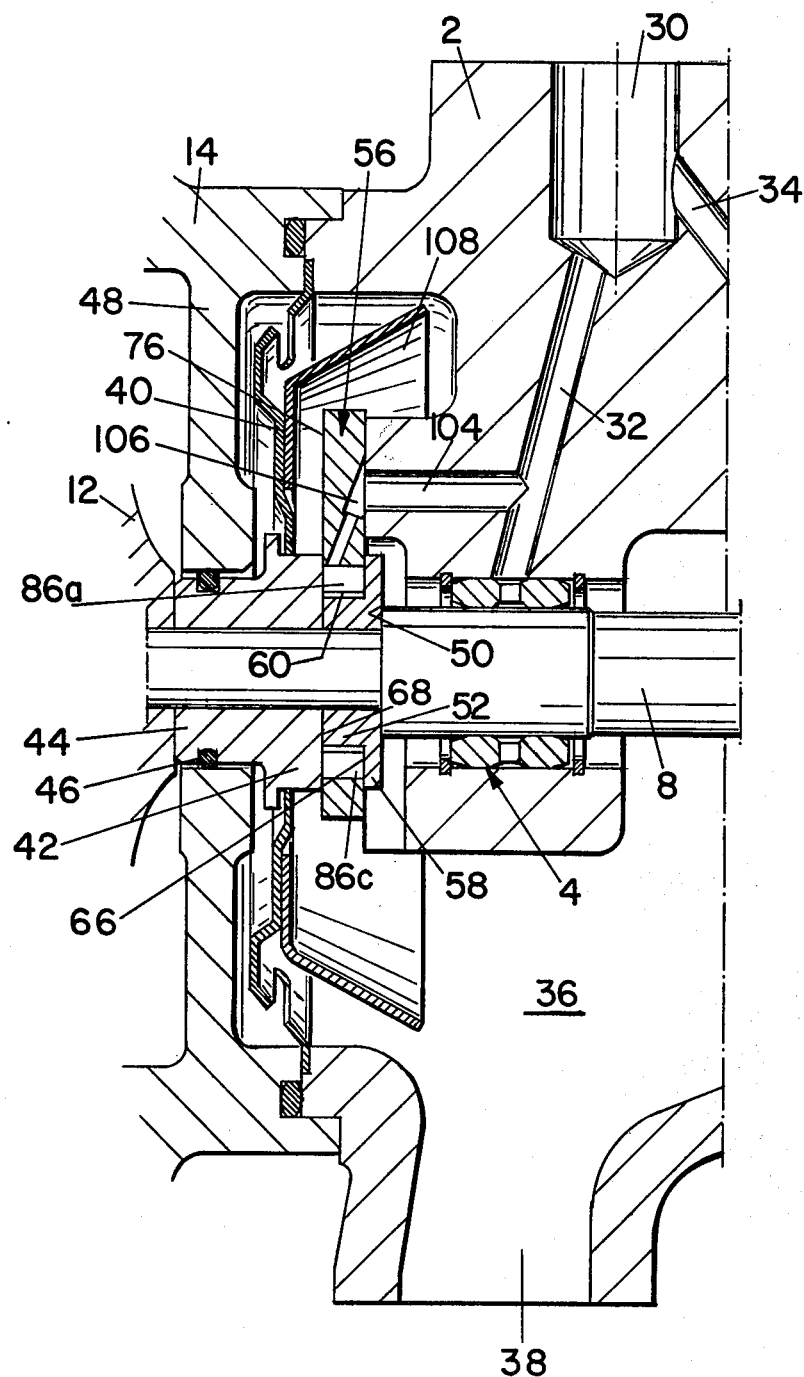
FIG. 1A shows an enlarged fragment of FIG. 1.
Figure 6:
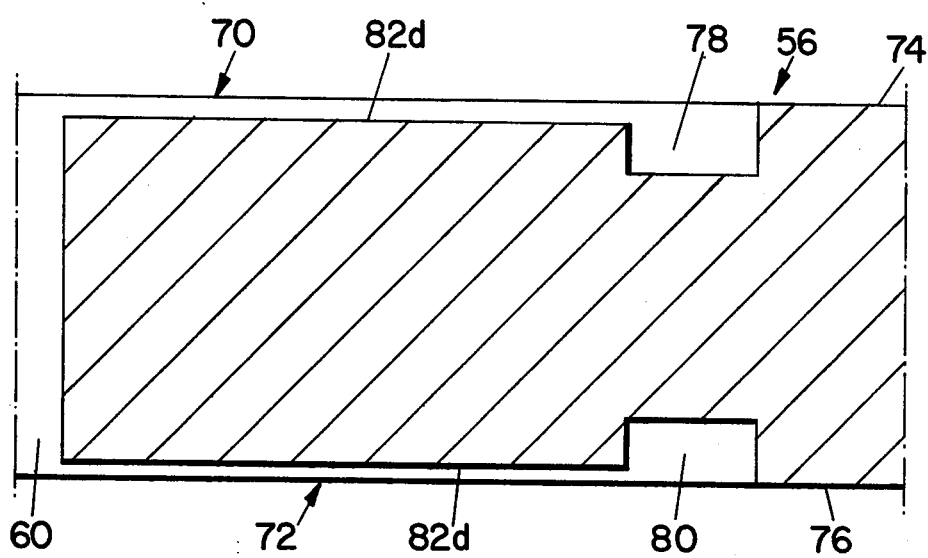
FIG. 6 is a fragmentary and enlarged section on line VI—VI in FIG. 2.

FIGS. 1 and 1A show a turbocharger comprising a cast housing 2 provided with sleeve bearings 4 and 6 supporting a shaft 8 integral with a radial inward flow turbine wheel 10. The turbine wheel rotatably drives the shaft 8 which in turn rotates a centrifugal compressor wheel 12 mounted on shaft 8. The compressor wheel 12 is in a compressor housing 14 attached to housing 2. Rotation of the wheel 12 accelerates air which is discharged into an annular diffuser 16 and then into a scroll-like outlet 18 from which the pressurized air is discharged via conduit 20 for supply, by any appropriate manner known per se as combustion air for an internal combustion engine (not shown). Exhaust gases are supplied by any appropriate manner to an inlet 22 of an inlet volute of a turbine housing 26 secured to the housing 2. The volute feeds the gases through an annular passage 28 to drive the turbine.

Lubricating oil from a supply (not shown) and fed to passage 30 travels via galleries 32 and 34 to lubricate the bearings 4 and 6 from which it emerges into chamber 36 for recirculation via outlet 38 to the said supply.

A baffle plate arrangement 40 is clamped between housings 2 and 14. Arrangement 40 extends in proximity to and about a flange 42 of a bush or slinger 44 provided with a seal ring 46 (FIG. 1A) against the wall of an aperture in wall 48 of the compressor housing 14.

As shown particularly in FIG. 1A, shaft 8 has a shoulder 50 against which bush 52 is pressed by slinger 44 urged by compressor wheel 12 in response to the pressure of clamping nut 54. Thus the bush 52 and slinger 44 on the shaft are firmly clamped against shoulder 50 and rotate with the shaft as it rotates the compressor wheel.

As shown in FIGS. 2-8, shaft 8 is held against substantial axial displacement by a thrust bearing arrangement provided by plate 56 interposed between the flange 42 and flange 58 on bush 52. The plate 56 is formed with a generally circular aperture 60 receiving the cylindrical body of bush 52 (FIG. 3), and has holes 62 countersunk at 64 to receive heads of screws (not shown) engaging threaded bores in the housing 2 to clamp the plate 56 thereto.

Flat side faces 66 and 68 (FIG. 1A), in spaced substantially parallel planes at substantially a right angle to the axis of shaft 8, on respective flanges 58 and 42 are counter-thrust surfaces each facing a respective annular thrust bearing 70 and 72 on respective sides 74 and 76 of the plate.

As shown in FIGS. 2 and 2A particularly, each annular thrust bearing 70 or 72 centered on axis Y of the aperture 60 comprises successive similar sectors 82a, 82b, 82c and 82d each extending around substantially 90° about axis X, each annular array of sectors being surrounded by a respective groove 78 or 80 on the side 74 or 76. Extending across the greater part of the width of each sector to adjacent the outer periphery 84 of the array of sectors is a respective notch 86a, 86b, 86c and 86d extending substantially radially from aperture 60, adjacent notches being disposed at substantially 90° to one another.

Arrow C or D (FIG. 2 or 3) shows the direction of rotation of counter-thrust surfaces 66 or 68 with respect to the corresponding thrust bearing 70 or 72.

Each sector 82 is separated at each end from the adjacent sector by a slight step 88 extending substantially radially with respect to axis X.

Figure 7:
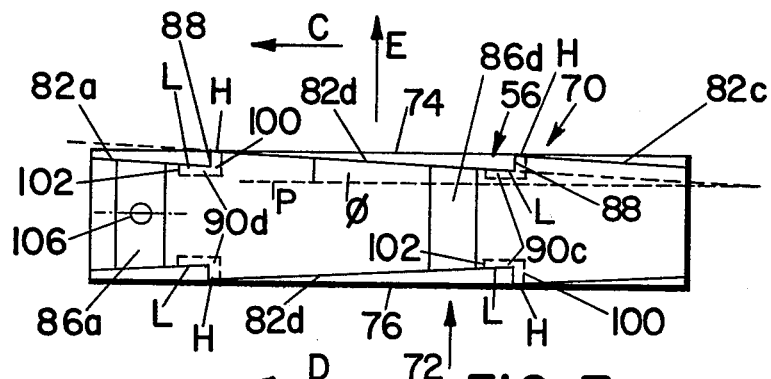
FIG. 7 is an imaginary view of a fragmentary section on line A in FIG. 2, viewed along direction B if that section were straightened.
Figure 8:
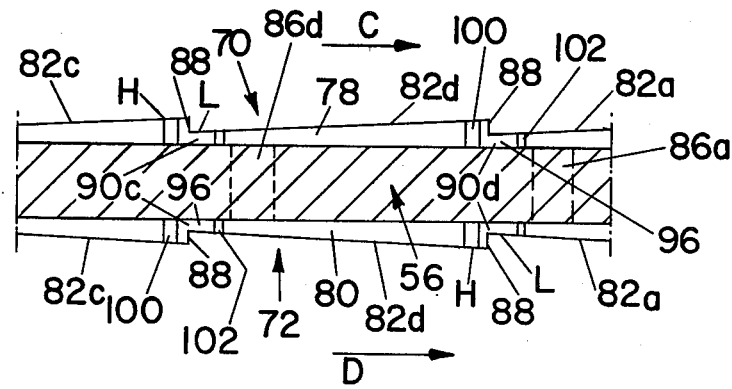
FIG. 8 is an imaginary view of a fragmentary section on line VIII—VIII in FIG. 2, if that section were straightened.

As shown in FIG. 7 and 8, each step 88 is due to each sector 82 being formed as a tapered land with respect to the flat base of the corresponding groove 78 or 80 such that around the sector, in the direction of rotation of corresponding counter-thrust surface, the bearing or thrust surface of the sector extends progressively further from the flat base of the groove. Thus, adjacent the step at each end of a said sector one end L of the sector can be considered as low and the other end H as high. The thrust bearing surface of each sector 82 between the ends H and L follows a substantially helical or wedge-like axis X in the direction (for example E in FIG. 7) in which the thrust bearing (for example 70) faces than the end L of that sector.

For a given thrust bearing 70 or 72 each step 88 thereon is angularly space by an angle $\theta$ from axis F, (FIG. 3), extending radially with respect to axis X, of the adjacent notch 86. The angle $\theta$ is taken, with respect to that notch, in the opposite direction to that in which the counter-thrust surface corresponding to that thrust face rotates past the notch. The angle $\theta$ may, for example, be substantially 30°.

The taper or slope angle $\phi$ of the wedge-like thrust surface of each sector 82 to a datum plane P, which may be parallel to the bases of grooves 78 and 80 or the faces 74 and 76 of the plate 56, may be small and may be of the order of minutes, for example 22 minutes.

Rebates or retrenchments 90a, 90b, 90c and 90d having bases level with the corresponding groove 78 or 80 extend generally radially inwardly of each thrust bearing 70 or 72 and are substantially equi-angularly spaced about axis X. Each retrenchment 90 eliminates a portion shown at 92 (FIG. 3) from the high end H of each sector 82 and a portion shown at 94 (FIG. 3) from the adjacent low end L of the adjacent sector.

Each retrenchment 90 has a substantially arcuate inner side wall 96 centered on the axis X and substantially concentric with wall 98 of aperture 60 forming the inner periphery of both thrust bearings 70 and 72. Side walls 100 (see FIG. 3 of the retrenchments 90 in a given annular thrust bearing 70 or 72 substantially lie along respective tangents to a circle F centered on axis X and of less radius than aperture 60. Side walls 102 (see FIG. 3) of the retrenchments in a given annular thrust bearing substantially lie along respective tangents to a circle G centered on axis X and of less radius than circle F.

It will be seen that side walls 100 of the retrenchments are close to or substantially coincide with steps 88, and may if extended inwardly of the bearing coincide with the radially innermost ends of the steps.

A gallery 104 branching from gallery 32 feeds lubricating oil into passage 106 (FIG. 1A) open at one end in surface 74 and opening at the other into notch 86a (FIG. 5). Thus oil is supplied to notch 86a, enters the space between the aperture wall 98 and shaft 8 and is distributed to the other notches. At the same time oil for the notches is propelled by rotation of counter-thrust surfaces over the thrust bearing 70 and 72 where interaction between the counter-thrust surfaces, and the thrust surfaces of the sectors pressurizes the oil (i.e. hydrodynamic lubrication) squeezing oil radially outwardly into the grooves 78 and 80 and beyond so that oil emerges into space 108 (containing the baffle arrangement 40) feeding the oil to chamber 36.

In each portion 92 of a retrenchment 90 omitted from the high end H of each sector 82, the greater part of that portion results from cutting away some of the radially outer parts of the high end, by virtue of the radially outer most end of side 100 of that retrenchment being with respect to axis X angularly closer to the low end L of that sector than the radially innermost end of side 100.

Figure 9:
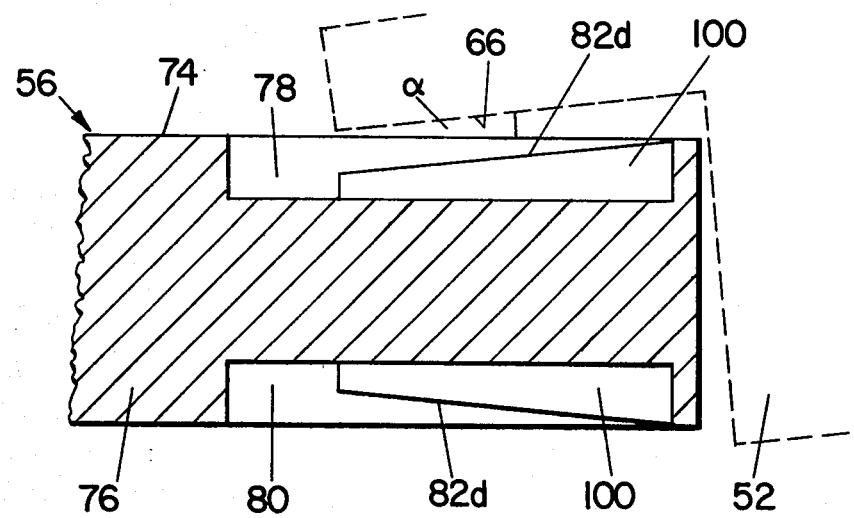
FIG. 9 is a fragmentary and enlarged section on line IX—IX in FIG. 2.

As the rotating shaft 8 performs a conical rotation the counter-thrust surfaces 66 and 68 are tilted at the cone angle $\alpha$ to sides 74 and 76 respectively of the plate 56, (see thrust surface 66 of the bush 52 in dotted lines in FIG. 9). Accordingly a radial portion of the counter-thrust surface comes nearest to the corresponding thrust bearing 70 or 72 and that radial portion sliding over the thrust bearing is closest to the latter when the radial portion is opposite a high end H of a sector 82. The occurrence of the thinnest oil layer between the counter-thrust surface and the thrust-bearing face is confined to each high end H as the counter-thrust surface slides thereover. The occurrences of maximum shear forces in the lubricating oil are confined to ends H. Because portion 92 of retrenchment 90 is omitted from each high end H the thinnest oil layer extends essentially along a line along retrenchment side wall 100. That line is of greatly reduced surface area in comparison with the surface area of retrenchment portion 92 which corresponds substantially to the area of the thinnest oil layer if retrenchments 90 were not provided. Such reduction in surface area of the thrust face where maximum shear forces occur, further reduces friction.

It will be seen from FIG. 9 that along a retrenchment side 100 the upper edge of the corresponding sector 82 slopes at an angle of which is the same or of the same order as the cone angle $\alpha$ of the conical rotation of the shaft 8. In order to attain that slope of the sector edge each of the retrenchments 90 may be formed substantially in accordance with the expression $\tan\psi = \alpha/\phi$, in which $\alpha$ is the aforesaid cone angle, $\phi$ is the aforesaid slope angle of the bearing surface of each sector 82, and $\psi$ is the angle (see FIG. 3) between the radially extending step 88 or high end face of the sector and the side 100 of the corresponding retrenchment 90.

By terminating the notches 86 short of outer periphery 84, the oil flow permeating the bearing arrangement is substantially limited to what it would be if the notches extended radially beyond the outer periphery 84. Nevertheless the provision of the notches ensures that the whole width of each sector 82 is supplied with oil.

While a preferred embodiment of the present invention has been described, it should be apparent to those skilled in the art that it may be practiced in different forms without departing from the spirit and scope thereof.

The maximum friction due to shearing of oil lubricant is reduced by reason of the aforesaid retrenchment reducing the area of contact between the conically rotating counter-thrust surface and the sector surface at the high end.

The tapered lands or sectors can each have any desired wedge-like or sloping shape provided the slope, at the high end of the sector, terminates in an end edge or retrenchment side which is substantially parallel to the tilted counter-thrust surface when the portion of the counter-thrust surface nearest the sector is opposite that edge.

Having thus described the invention, what is claimed as novel and desired to be secured by Letters Patent of the United States is:

1. A turbo machine thrust bearing system for a rotatable shaft journalled for rotation and having an annular counter thrust surface, said thrust bearing system comprising:
   a plate comprising a central aperture through which the shaft extends and having a plurality of tapered lands having a low end and a high end defining bearing sectors disposed in succession in an arcuate array about the aperture, each sector in the radially outer portion thereof adjacent the high end being retrenched along the sector towards the low end of the sector so that along the direction of rotation of the counter thrust surface relative to the sector, the outer portion of the high end terminates before a more radially inner portion of the high end.

2. Apparatus as in claim 1 wherein said retrenchments are arcuate in shape when viewed in a plane normal to the axis of said central aperture.

3. Apparatus as in claim 1 wherein said lands each have a notch opening into said central aperture adjacent the low end of each sector.

4. Apparatus as in claim 1 wherein said plate has a perimeter groove interconnecting said retrenchments.

5. Apparatus as in claim 4 wherein said retrenchments are arcuate in shape when viewed in a plane normal to the axis of said central aperture.

6. Apparatus as in claim 5 wherein at least one of said lands has a notch opening into said central aperture adjacent the low end of each sector.

7. Apparatus as in claim 6 wherein all of said lands have said notches.

8. Apparatus as in claim 7 wherein lands are retrenched in the low ends also.

9. Apparatus as in claim 8 wherein said lands are formed on opposite faces of said plate.

10. Apparatus as in claim 9 wherein said plate has a passage extending from one of said notches to a radially outer portion of said plate whereby oil may be passed to the notches.

* * * * *